April 17, 1951     T. F. SCHLICKSUPP     2,549,531
WAFFLE BAKING MACHINE

Filed March 25, 1949     3 Sheets-Sheet 1

INVENTOR.
Theodore F. Schlicksupp
BY
ATTORNEYS

April 17, 1951     T. F. SCHLICKSUPP     2,549,531
WAFFLE BAKING MACHINE

Filed March 25, 1949     3 Sheets-Sheet 2

INVENTOR.
Theodore F. Schlicksupp
BY
ATTORNEYS

April 17, 1951 T. F. SCHLICKSUPP 2,549,531
WAFFLE BAKING MACHINE
Filed March 25, 1949 3 Sheets-Sheet 3
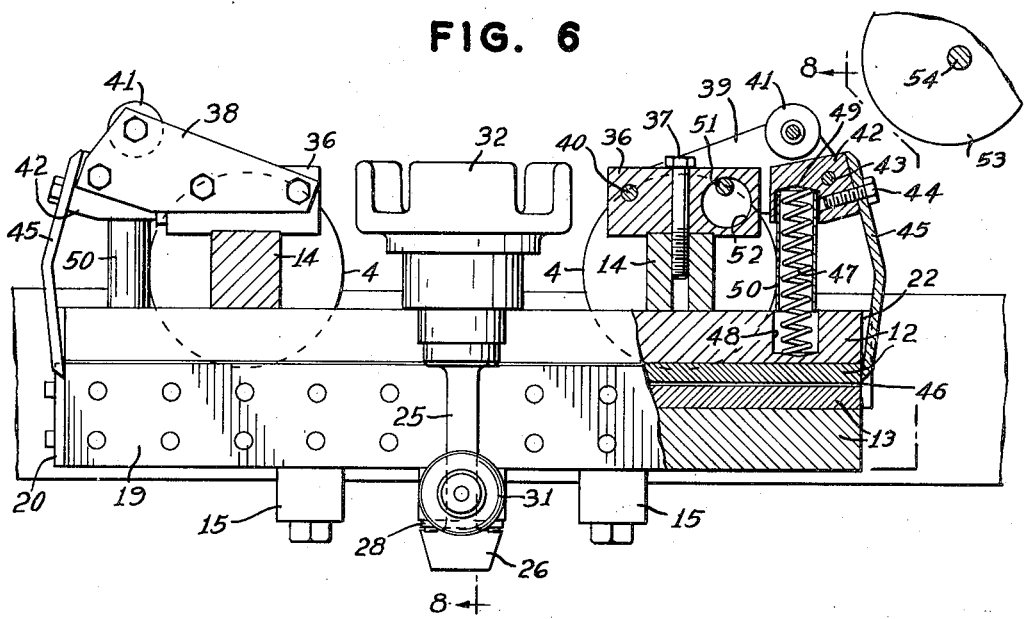
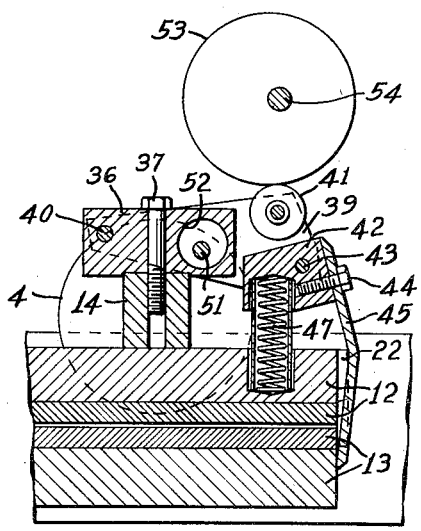
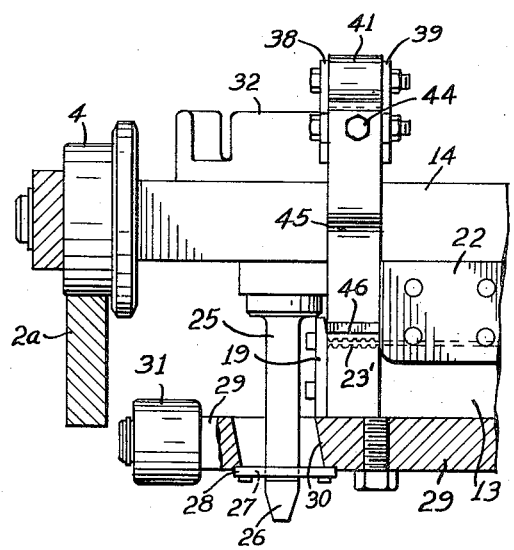
INVENTOR.
Theodore F. Schlicksupp
BY
ATTORNEYS Patented Apr. 17, 1951

2,549,531

UNITED STATES PATENT OFFICE 2,549,531

WAFFLE BAKING MACHINE

Theodore F. Schlicksupp, Long Island City, N. Y.

Application March 25, 1949, Serial No. 83,355

5 Claims. (Cl. 107—58)

This invention relates to improvements in waffle baking machines.

Waffle baking machines are in use in which waffle irons or molds, sometimes referred to as "books," pass in an endless series past a station where the waffle irons are opened and filled with batter, then through a baking oven, and back to the filling station where the baked waffle is stripped from each waffle iron as soon as it is opened and prior to its being re-filled with batter. During the baking stage, a certain amount of steam is generated in the waffle irons from the moisture content in the batter and therefore steam vents must be provided on each waffle iron at certain places where the two plates of the waffle iron meet to allow the steam to escape. These vents have the disadvantage of allowing a certain amount of the batter itself to escape through them in addition to the steam. This overflow batter which bakes in the form of projections on the edges of the waffles has heretofore been removed from them after the waffles are removed from the waffle irons. This operation is, of course, time-consuming and costly, and therefore objectionable.

The principal object of this invention is to provide a waffle baking machine of the kind above described with means for automatically removing the overflow batter which has escaped through the steam vents of the waffle irons while the waffles are still in them and prior to the opening of the waffle irons for the removal of the waffles.

According to the invention, each of the waffle irons is provided with cutting or trimming means movably mounted adjacent each steam vent, and actuating means is provided on the machine for automatically operating the cutter or trimmer as each waffle iron reaches a position in advance of the station at which the baked waffles are removed from the irons.

The advantages of a waffle baking machine in which the batter overflow is automatically removed from the waffle irons in this manner are readily apparent, for in operating it, the previous costly and time-consuming practice of trimming the edges of the waffles after they have been removed from the waffle irons is made unnecessary. In the improved machine this operation is performed automatically while the waffles are still within the waffle irons and while the irons are passing through a portion of their path of travel through the waffle baking machine.

Further advantages will be apparent from the following description of a specific form of the invention illustrated in the accompanying drawings, in which:

Fig. 6 is a side elevation, partly in vertical section, of one of the waffle irons as it appears just before passing under the actuating means which operates the cutters or trimmers, the section being taken on the line 6—6 of Fig. 4;

Fig. 7 shows the leading end of the waffle iron of Fig. 6 after it has reached the position in which the trimming means at the leading edge of the waffle iron has been operated by the actuating means; and Fig. 8 is a partial end elevation, partly in vertical section, of the waffle iron shown in Fig. 6, the section being taken along the line 8—8 of Fig. 6.

Figure 1:
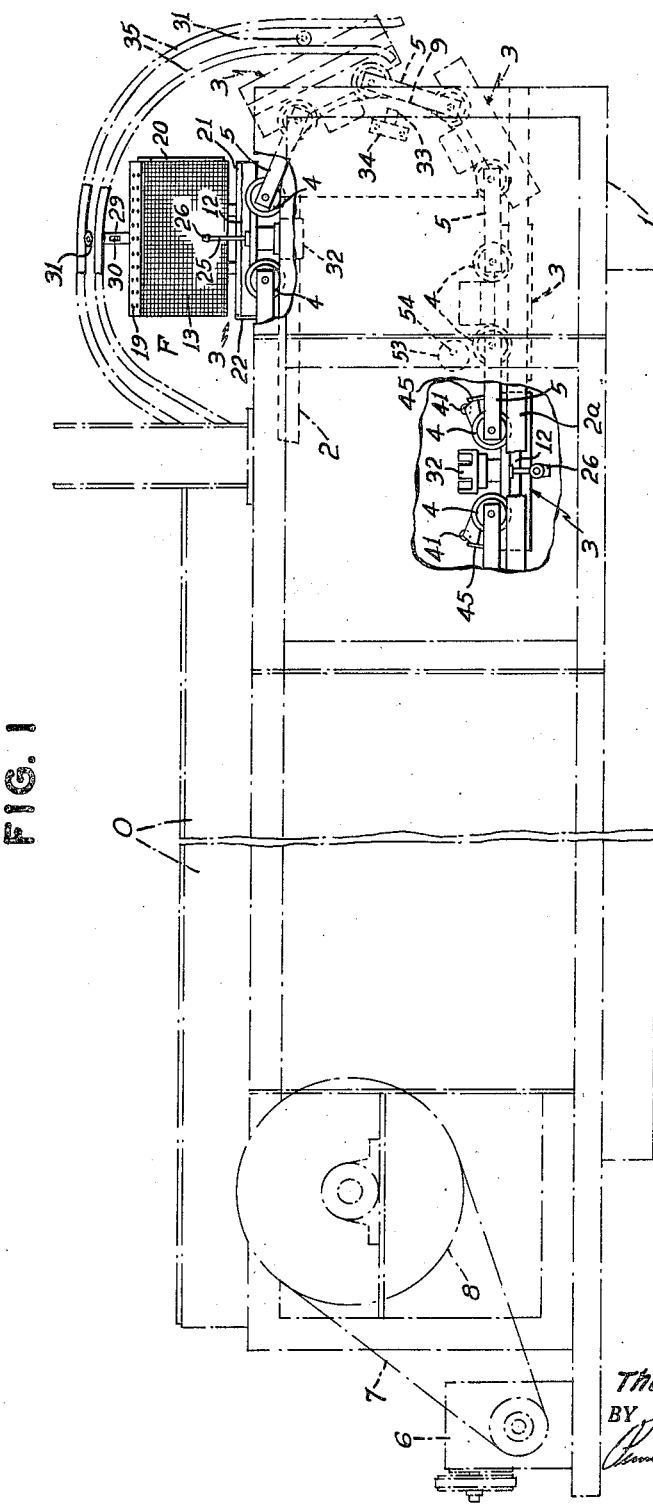
Figure 1 is a side elevation of a waffle baking machine embodying the invention, part of the machine being shown in phantom.

The waffle baking machine shown in the drawings, apart from the present improvements, is of a well-known type and will first be described, but only in sufficient detail to give a proper understanding of the invention.

Referring first to Figs. 1–5, the waffle baking machine comprises a framework 1 which supports an upper track 2 and a lower track 2a. A number of waffle irons 3, each provided with four wheels 4 are connected in an endless series by a set of links 5 at each side of the machine. As best shown in Fig. 1, each link pivotally connects the wheel axle at the end of one waffle iron to the wheel axle at the adjacent end of the next waffle iron. Movement of the waffle irons through the machine is effected by a motor-driven mechanism 6 (Fig. 1), drive chain 7, and sprocket 8. When the waffle irons are moving along the lower run of their course their wheels roll on the lower track 2a and they move from left to right in Fig. 1. When the waffle irons reach the end of the lower track 2a their wheels roll on curved members 9 which guide the waffle irons onto the upper track 2. The movement of the waffle irons on the upper track is therefore from right to left in Fig. 1. During movement of the waffle irons from the lower track to the upper track they are automatically opened as hereinafter described and then move successively past the filling station while open. The filling station is designated F in Fig. 1. Here a predetermined amount of batter is introduced into each waffle iron by a pump (not shown) after a baked waffle has been removed from the open iron. As the waffle irons leave the filling station they are automatically closed and then pass successively through a baking oven designated O in Fig. 1.

Each of the waffle irons comprises essentially a pair of hinged mold sections, one of which is relatively fixed and the other of which swings relative to the first one. A plate 12 (Fig. 5) forms a part of the relatively fixed section and a plate 13 forms a part of the swinging section. The two surfaces of the plates which come together when the waffle iron is closed are molded to give them the usual waffle pattern. The plate 12 is supported on a pair of transverse axle bars 14 (Fig. 5) on the end of which the wheels 4 are mounted. Thus, when the waffle iron is supported on the upper track 2 the transverse bars 14 extend under the plate 12 and support it with its waffle-pattern surface facing upwards. The plate 13 is secured at its outer side to a pair of transverse metal strips 15 (Figs. 2 and 5) which project beyond one longitudinal edge of the plate. The projecting end of each strip 15 carries at its inner side a hinge lug 16. Each of the axle bars 14 which support the plate 12 carries a similar hinge lug 17. A hinge pin 18 passing through all of the hinge lugs hingedly connects the two plates 12 and 13 of the waffle iron.

Figure 3:
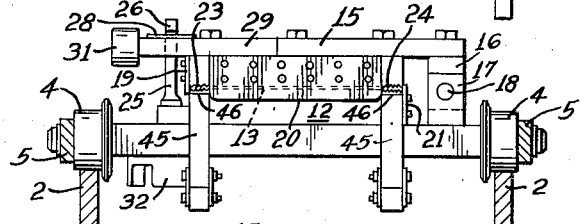
Fig. 3 is an end view of the waffle iron shown in Fig. 2.
Figure 4:
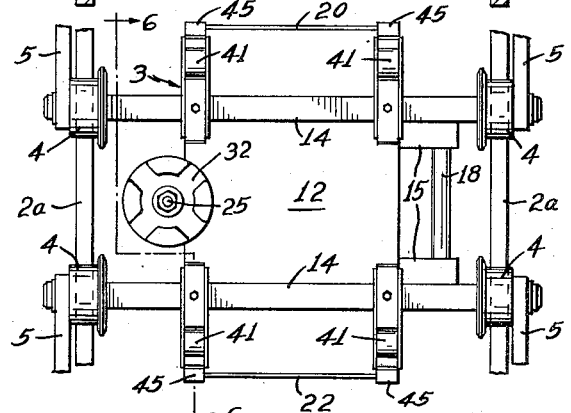
Fig. 4 is a plan view of one of the waffle irons as it appears when looking down upon it while it is travelling upside down along the lower track of the machine.
Figure 5:
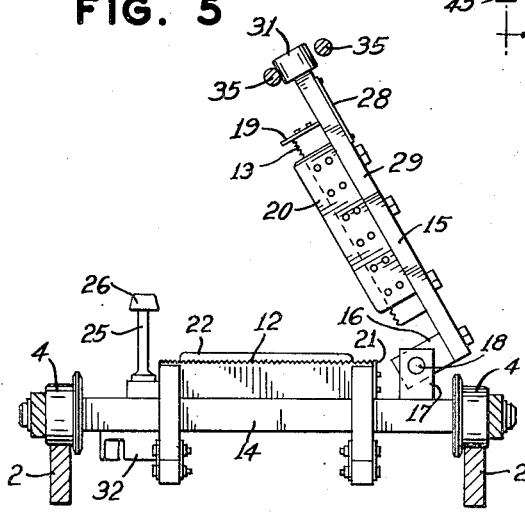
Fig. 5 is an end view of one of the waffle irons opened to permit removal of a baked waffle and the re-filling of the waffle iron with fresh batter.

Provision is made for confining the waffle batter between the meeting surfaces of the waffle plates after it has been introduced into the waffle iron and after the waffle iron has been closed. In the particular machine illustrated in the drawings this is accomplished by metal strips attached to the edge faces of one plate of the waffle iron which overlap the corresponding edge faces of the other plate. In the machine illustrated two of such strips are secured to two contiguous edge faces of one plate and two are secured to the contiguous edge faces of the other plate which are not overlapped by the strips on the first-mentioned plate. As best shown in Figs. 3 and 5, the longitudinal edge face of the swinging plate 13 farthest from the hinge pin 18, has secured to it a metal strip 19 which projects slightly beyond the inner surface of the plate so that when the waffle iron is closed the projecting portion of this strip overlaps the other plate 12 a small amount. Another strip 20 is similarly secured to that edge face of the swinging plate 13 which constitutes the rear end face thereof when the waffle iron is moving on the upper track. The projecting portion of this strip also overlaps the other plate 12 when the waffle iron is closed. The plate 12 carries two similar strips 21 and 22 (Fig. 5), the former being secured to the edge face of the plate nearest the hinge pin 18 and the latter being secured to that edge face of the plate which constitutes its forward end face when the waffle iron is moving on the upper track 2. When the waffle iron is closed these two strips overlap the corresponding edge faces of the swinging plate 13. The four metal strips 19, 20, 21 and 22 therefore overlie the line of juncture between the two plates of the waffle iron when the waffle iron is closed and confine the batter between the two plates. However, the two end strips 20 and 22 are purposely made shorter than the width of the waffle iron plates so that when the waffle iron is in closed position vents are left at opposite ends of these strips. Two of these vents appear at 23 and 24 in Fig. 3. Two corresponding vents exist at the opposite end of the waffle iron one of which appears at 23' in Fig. 8. There are therefore four of these vents, one at each corner of the waffle iron. The vents permit the steam and vapors to escape from the waffle iron during the baking of the waffle.

Figure 2:
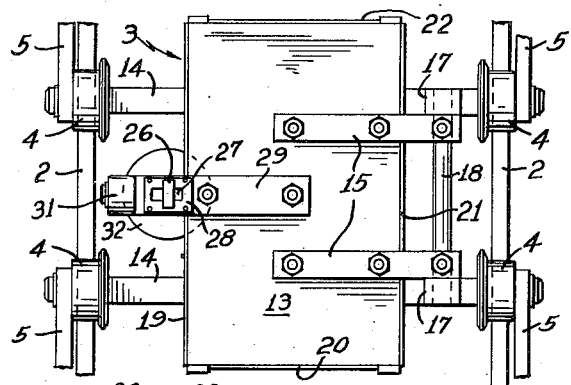
Fig. 2 is a plan view of one of the waffle irons as it appears when looking down upon it while it is travelling on the upper track of the machine.

Each waffle iron is provided with a latch which is actuated after batter has been introduced into the waffle iron and after the waffle iron has been closed to latch the swinging section of the waffle iron to the fixed section and prevent them from separating until the latch is again actuated to permit opening of the waffle iron just before it reaches the filling station. The latch comprises a shaft 25 (Figs. 1, 3, 5, 6 and 8) mounted on the fixed section of the waffle iron and projecting toward the other section. It is mounted so that it can rotate about its own axis. It has an enlarged latching head 26 (Figs. 1, 2, 3, 5, 6 and 8). When the latch head is in the position shown in Fig. 5 it can pass through an elongated opening 27 (Fig. 2) in a latch plate 28 secured to a metal strip 29 which in turn is secured to the outer side of the swinging plate 13 and projects beyond its longitudinal edge farthest from the hinge pin 18. The metal strip 29 is provided with an opening 30 (Fig. 8) under the latch plate 28 through which the head 26 of the latch can also pass. After the latch head 26 passes through the opening 27 in the latch plate and is turned 90° so that its long axis is at right angles to the long axis of the opening 27 as shown in Fig. 2, it is evident that the two sections of the waffle iron will be latched in closed position. At the end of the metal strip 29 which carries the latch plate 28 there is a roller 31 (Figs. 2, 3, 5, 6 and 8) the purpose of which will be presently described. The other end of the latch shaft 25 has secured to it a Geneva wheel 32, best shown in Figs. 4, 5, 6 and 8, which when actuated as hereinafter described, turns the latch shaft and consequently its head 26 to latching and unlatching positions.

When each waffle iron is moving along the lower track 2a it is in inverted position and the swinging plate 13 is then at the lower side of the waffle iron. The latch head 26 is also then at the lower side of the waffle iron but the Geneva wheel 32 is at the upper side as will be seen from Fig. 1. Just after each waffle iron starts moving upwardly around the curved members 9 (Fig. 1) a pin 33 mounted in a bracket 34 engages the Geneva wheel and turns it a quarter of a revolution so that the latch head 26 is turned from its latching position shown in Fig. 2 to its unlatching position which permits the waffle iron to be opened. The above-mentioned roller 31 at the end of the metal strip 29 on the swinging plate 13 then enters a cam track 35 (Fig. 1) so shaped that during movement of the waffle iron onto the upper track 2 the swinging section of the waffle iron will be moved to open position and will reach fully open position by the time the waffle iron arrives at the filling station F. As soon as each waffle iron opens far enough, an operator stationed at the end of the machine strips the baked waffle from it. As previously stated, fresh batter is introduced into the open waffle iron at the station F, and as it proceeds along the upper track 2, the swinging section of the waffle iron is moved to closed position by the cam track 35 and then a pin similar to the one shown at 33, but not shown in the drawing, again actuates the Geneva wheel 32 and turns the latch head 26 to latching position.

The details of the machine as thus far described do not form part of the invention. As previously stated, the above-described vents at the four corners of each waffle iron which permit steam and vapors to escape from between the waffle iron plates during the baking of the waffle also permit some of the batter to escape through the vents, and the additional parts added to the machine in accordance with the invention are for removing this excess batter. These parts are best shown in Figs. 6–8. Two blocks 36 are secured to each axle bar 14 by any suitable means such as bolts 37 (Fig. 6) so that there is one of these blocks near each corner of each waffle iron. When the waffle iron is on the lower track 2a and the waffle iron is in the inverted position shown in Fig. 6 these blocks are supported on the upper faces of the axle bars 14 and at the upper side of the waffle iron. A pair of plates 38 and 39 at opposite sides of each block 36 are pivotally connected to it by a pivot pin 40 extending through the block. The two plates 38 and 39 also support between them a roller 41. A knife-carrying block 42, pivotally mounted between each pair of plates 38 and 39 by a pin 43, has attached to it by a bolt 44, a knife blade 45, so positioned that in its normal position its cutting edge 46 lies just above one of the above-mentioned steam vents as shown in Fig. 8. The relationship between the cutting edges of the trimming knives and the steam vents is also shown in Fig. 3, although in this figure the waffle iron is not shown in inverted position and therefore the cutting edges of the knives appear below the steam vents. Each knife-carrying block 42 is biased on its pivot 43 by a coil spring 47 in such a way that the end of the knife blade is yieldingly urged toward the end faces of the waffle iron plates 12 and 13. The opposite ends of each coil spring 47 may be accommodated in openings 48 and 49 drilled respectively in the outer face of the waffle iron plate 12 and the confronting face of the knife-carrying block 42, and may be guided by a section of tubing 50. A pin 51 extends between each pair of plates 38—39 and also through a relatively large opening 52 in the corresponding block 36. The spring 47 not only tends to rock the knife-carrying block 42 around its pivot and maintain the end of the knife in yielding contact with the end faces of the waffle iron plates as above described, but it also biases the plates 38 and 39, and hence the knife itself, to normal inoperative position, i. e., their uppermost position as viewed in Fig. 6. In this position of the parts the pin 51 contacts with the upper portion of the curved surface of the opening 52 in the block 36. This pin therefore constitutes a stop to limit the upward movement of the knife blade as viewed in Fig. 6.

When each waffle iron has almost completed its travel along the lower track 2a the rollers 41 pass under cam means which depresses the rollers and thereby actuates the knife blades. The cam means may be a single cam shown at 53 (Figs. 1, 6 and 7) arranged to act on both rollers 41 at the leading end of the waffle iron and then on both rollers at the trailing end of the waffle iron, or it may comprise two separate cams one of which acts successively on the two rollers 41 at one edge of the waffle iron and the other of which acts successively on the two rollers 41 at the opposite edge of the waffle iron. In any event, the cam means 53 depresses each roller 41 as it moves thereunder and thereby swings the plates 38 and 39, the knife-carrying block 42, and the knife carried thereby, about the pivot pin 40 in a direction to move the cutting edge of the knife across the steam and vapor vent and thereby remove any batter adhering to the baked waffle and to the end faces of the waffle iron. Fig. 7 shows the position of the parts at the end of the cutting stroke. During movement of the parts to the position shown in this figure the spring 47 is compressed, as shown, and the more it is compressed the firmer it presses the cutting end of the knife into engagement with the end faces of the waffle iron plates. When each roller 41 moves beyond the cam 53, spring 47 returns the parts to their normal position shown in Fig. 6.

The cam 53 is preferably mounted eccentrically on a shaft 54 as shown in Figs. 1, 6 and 7 so that by turning it on the shaft the length of the stroke imparted to the knife can be varied.

It will now be seen that there is associated with each steam and vapor vent on each waffle iron a trimming knife which is automatically actuated during travel of the waffle iron through the machine, preferably at a location at which the baking of the waffle is completed, for trimming the excess batter from the baked waffle and from the waffle iron prior to the removal of the waffle from the waffle iron and without the necessity of any manual trimming operation of the kind that was heretofore necessary.

I claim:

1. In a waffle baking machine in which waffle irons, each comprising a pair of mold sections and each provided with at least one steam vent, are moved successively past a station at which they are opened and filled with batter and then past heating means which bakes the waffles, means for removing the batter that escapes through the steam vent of each waffle iron, said means comprising a knife mounting carried by one mold section of each waffle iron for movement relative to such section, a knife blade on said mounting and having a cutting edge arranged to move across the steam vent of the corresponding waffle iron when the knife mounting is actuated relative to the mold section which carries it, and cam means mounted on a stationary part of the machine arranged to engage a part on the knife mounting as said part passes the cam means to thereby actuate the knife mounting relative to the mold section which carries it and cause the cutting edge of the knife blade to move across the steam vent of the corresponding waffle iron and remove any batter that has escaped therethrough, said cam means being located at such a point along the path of travel of the waffle irons that it actuates the knife mounting on each waffle iron after the baking of the waffle therein is substantially completed by the heating means.

2. In a waffle baking machine in which waffle irons, each comprising a pair of hinged plates and each having at least one steam vent at the juncture line between the plates, are moved successively past a station at which they are opened and filled with batter and then past heating means which bakes the waffles, means for removing the batter that escapes through the steam vent of each waffle iron, said means comprising a knife mounting pivotally carried by each waffle iron, a knife blade on said mounting and having a cutting edge arranged to move across the steam vent when the knife mounting is actuated about its pivot, and cam means mounted on a stationary part of the machine arranged to engage a part on the knife mounting as said part passes the cam means to thereby actuate the knife mounting and cause the cutting edge of the knife blade to move across the steam vent and remove any batter that has escaped therethrough, said cam means being located at such a point along the path of travel of the waffle irons that it actuates the knife mounting on each waffle iron after the baking of the waffle therein is substantially completed by the heating means.

3. In a waffle baking machine in which waffle irons, each comprising a pair of hinged plates and each having a steam vent at each of its corners at the juncture line between the plates, are moved successively past a station at which they are opened and filled with batter and then past heating means which bakes the waffles, means for removing the batter that escapes through the steam vents of each waffle iron, said means comprising four knife mountings pivotally carried by each waffle iron and each carrying a knife blade arranged so that its cutting edge moves across one of said steam vents when the knife mounting is actuated about its pivot, and cam means on a stationary part of the machine arranged to engage a part on each knife mounting as said part passes the cam means to thereby actuate the corresponding knife mounting and cause the edge of its knife blade to move across the corresponding steam vent and remove any batter that has escaped therethrough, said cam means being located at such a point along the path of travel of the waffle irons that it actuates the knife mounting on each waffle iron after the baking of the waffle therein is substantially completed by the heating means.

4. In a waffle baking machine in which a waffle iron comprising a pair of hinged plates and having at least one steam vent at the juncture line between the plates, is moved past a station at which it is opened and filled with batter and then past heating means which bakes the waffle, means for removing the batter that escapes through the steam vent, said means comprising a knife mounting pivotally carried by the waffle iron, a knife blade on said mounting and having a cutting edge which in the normal position of the knife mounting lies adjacent the steam vent and which is arranged to move across the steam vent when the knife mounting is moved from its normal position to produce a cutting stroke of the knife blade, spring means for returning the knife and its mounting to normal position after the knife mounting has been actuated to produce a cutting stroke of the knife, stop means for arresting the return movement of the knife mounting when it reaches its normal position, and cam means mounted on a stationary part of the machine arranged to engage a part on the knife mounting as said part passes the cam means to thereby actuate the knife mounting to produce a cutting stroke of the knife and cause the cutting edge of the knife blade to move across the steam vent and remove any batter that has escaped therethrough, said cam means being located at such a point along the path of travel of the waffle iron that it actuates the knife mounting after the baking of the waffle has been substantially completed.

5. A waffle baking machine in accordance with claim 4 in which said knife blade is secured to a portion of the knife mounting which can pivot with respect to the rest of the knife mounting, and said spring which serves to return the knife mounting to normal position acts on said portion to which the knife blade is secured so that the cutting edge of the knife is yieldingly biased inwardly toward the steam vent.

THEODORE F. SCHLICKSUPP.

REFERENCES CITED

The following references are of record in the file of this patent:

UNITED STATES PATENTS

| Number | Name | Date |
|---|---|---|
| 881,824 | Peters | Mar. 10, 1908 |
| 1,899,302 | Balton | Feb. 28, 1933 |

FOREIGN PATENTS

| Number | Country | Date |
|---|---|---|
| 4,303 | Australia | Nov. 4, 1927 |